(12) United States Patent
Hess et al.

(10) Patent No.: US 8,876,448 B1
(45) Date of Patent: Nov. 4, 2014

(54) GAS TURBINE HALF-CASING SHIPPING FIXTURE

(71) Applicant: General Electric Company, Schenectady, NY (US)

(72) Inventors: John Raymond Hess, Seneca, SC (US); Netaji Haribhau Mane, Bangalore (IN); Gregory Allan Crum, Mauldin, SC (US); Jason Allen Seale, Simpsonville, SC (US); David William Hogg, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/012,503

(22) Filed: Aug. 28, 2013

(51) Int. Cl.
  *B60P 7/08* (2006.01)
  *B60P 7/06* (2006.01)
(52) U.S. Cl.
  CPC ........................................ *B60P 7/06* (2013.01)
  USPC ................................. 410/46; 410/49; 60/796
(58) Field of Classification Search
  USPC ............... 410/44, 46, 47, 49, 120; 415/213.1; 248/671; 108/55.3; 60/796
  See application file for complete search history.

(56) References Cited

U.S. PATENT DOCUMENTS

| 2,828,931 | A  | * | 4/1958 | Harvey ........................... 410/46 |
|-----------|----|---|--------|-------------------------------------------|
| 6,334,746 | B1 |   | 1/2002 | Nguyen et al. |
| 6,793,458 | B2 |   | 9/2004 | Kawai et al. |
| 7,704,024 | B2 |   | 4/2010 | Kootstra et al. |
| 8,186,916 | B2 |   | 5/2012 | Wessel et al. |
| 8,506,218 | B2 | * | 8/2013 | Delgado Matarranz et al. .............................. 410/44 |

OTHER PUBLICATIONS

U.S. Appl. No. 13/736,421, filed Jan. 8, 2013 (pending).

* cited by examiner

*Primary Examiner* — Stephen Gordon
(74) *Attorney, Agent, or Firm* — Nixon & Vanderhye P.C.

(57) ABSTRACT

A shipping fixture for a turbine lower casing includes a frame having a substantially rectangular shape including a pair of elongated, laterally-spaced side beams and a pair of transverse end beams. A first lateral support structure extends between the side beams at a first location corresponding to a first vertically-oriented joint between the turbine compressor casing section and the turbine combustor casing section; and a second lateral support structure includes support blocks mounted on the side beams at a second location corresponding to a second vertically-oriented joint between the turbine combustor casing section and the turbine stage casing section.

10 Claims, 5 Drawing Sheets

GAS TURBINE HALF-CASING SHIPPING FIXTURE

BACKGROUND OF THE INVENTION

This invention relates generally to turbine technology and, more specifically, to the manner in which a partially assembled, lower half-casing of a gas turbine can be shipped to an ultimate site of operation.

After testing of a fully assembled turbine engine has been completed on a test stand at the manufacturer's site, the turbine unit must be shipped to its ultimate installation site. There are, however, a number of problems associated with transporting a fully assembled gas turbine engine. For example, many potential power plant sites at remote locations are not easily accessible in that transport lanes (railroads or roads) cannot support the weight/height of a substantially fully-assembled gas turbine. In such cases, the alternative may be disassembly of the turbine and multiple shipments of partial assemblies. Such partially disassembled units weigh considerably less than a fully-assembled turbine and can be shipped over roads or rails with lower weight limits.

Partially disassembled units, however, also pose shipping problems. For example, if the upper turbine half-casing and rotor are removed, it may well be possible to ship the lower half-casing with various components remaining therein, but if not properly supported, the lower half-casing may deflect excessively and violate stress limits imposed by design practices. As a result, even if no permanent damage has been sustained, realignment, resetting of all clearances and increased testing may be required before the turbine can enter service.

It would therefore be desirable to provide a mechanism by which a partially assembled lower-half casing of a gas turbine can be shipped to its installation site, with required support and alignment safeguards.

BRIEF SUMMARY OF THE INVENTION

In a first exemplary but nonlimiting embodiment, there is provided a shipping fixture for a turbine lower half-casing comprising a frame having a substantially rectangular shape including a pair of elongated, laterally-spaced side beams and a pair of transverse end beams; a first turbine casing joint support extending between the side beams at a first location corresponding to a first vertically-oriented joint between a turbine compressor casing section and a turbine combustor casing section; and a second turbine casing joint support structure including bearing blocks mounted on the side beams at a second location corresponding to a second vertically-oriented joint between the turbine combustor casing section and a turbine stage casing section.

In another nonlimiting aspect, there is provided turbine lower half-casing and shipping fixture assembly comprising a turbine lower half-casing including a compressor section, a combustor section and a stage section in axial alignment and joined together at first and second joints, the lower half-casing having upper flanges adapted for mating engagement with corresponding flanges on an upper turbine half-casing; a support fixture supporting the turbine lower half-casing, said support fixture comprising a frame having a substantially rectangular shape including a pair of elongated, laterally-spaced side beams and a pair of transverse end beams; a first turbine casing joint support extending between the side beams at a first location corresponding to a first vertically-oriented joint between the compressor section and the combustor section; and second turbine casing joint support elements including bearing blocks mounted on the side beams and engaging the lower turbine half-casing at a second location corresponding to a second vertically-oriented joint between the combustor section and the stage section.

In still another aspect, the present invention provides a turbine lower half-casing and shipping fixture assembly comprising: a turbine lower half casing including a compressor section, a combustor section and a stage section in axial alignment and joined together at first and second joints, the lower half-casing having upper flanges adapted for mating engagement with corresponding flanges on an upper turbine half-casing; a shipping fixture assembly supporting the turbine lower half-casing, the shipping fixture assembly comprising a frame having a substantially rectangular shape including a pair of elongated, laterally-spaced side beams and a pair of transverse end beams; a first lateral support structure extending between the side beams at a first location corresponding to a first vertically-oriented joint between the turbine compressor section and the turbine combustor section; a second lateral support structure comprising bearing blocks mounted on the side beams and engaging the lower turbine half-casing at a second location corresponding to a second vertically-oriented joint between the turbine combustor section and the turbine stage section; at least two additional stiffening bars extending between the side beams at locations axially between the first and second lateral support structures, and axially between the second lateral support structure and one of the transverse end beams; and a plurality of beams extending laterally between the upper flanges on opposite sides of the lower half-casing.

The invention will now be described in greater detail in connection with the drawings identified below.

DETAILED DESCRIPTION OF THE INVENTION

Figure 1:
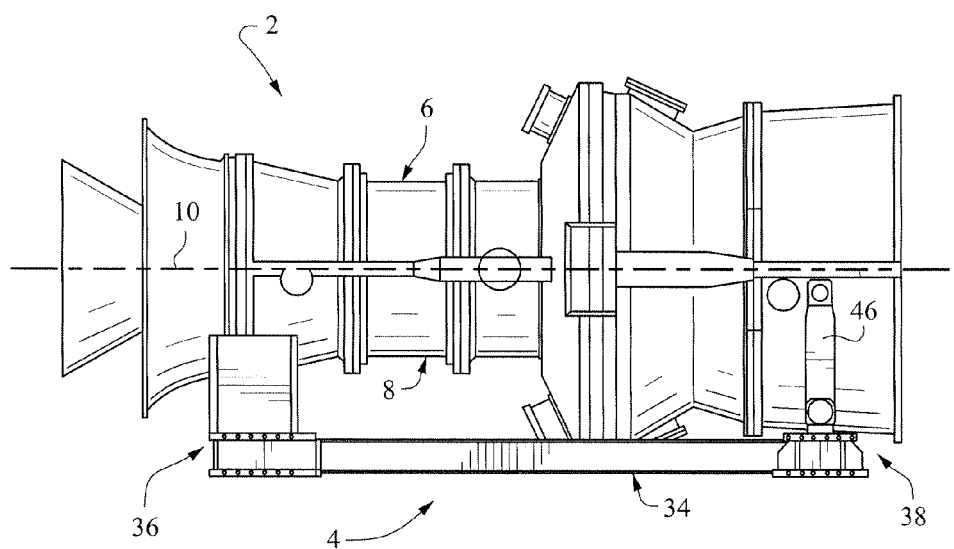
FIG. 1 is a simplified side elevation of a turbine supported on a conventional frame.

FIG. 1 illustrates in simplified form, a gas turbine engine 2 on a support stand 4. The turbine includes an upper half-casing 6 joined to a lower half-casing 8 along a horizontal joint 10. This is a typical arrangement enabling testing of the turbine at a manufacturing site, prior to shipment to a customer. As indicated above, it is not always possible to ship a fully-assembled turbine, especially to remote and/or undeveloped sites with insufficient infrastructure. This invention provides a modified support stand and related shipping support structures that enable shipment of a partially-assembled lower half-casing without excessive stress and without the need for realignment and re-setting of assembly clearances, and extensive additional pre-service testing at the installation site.

Figure 2:
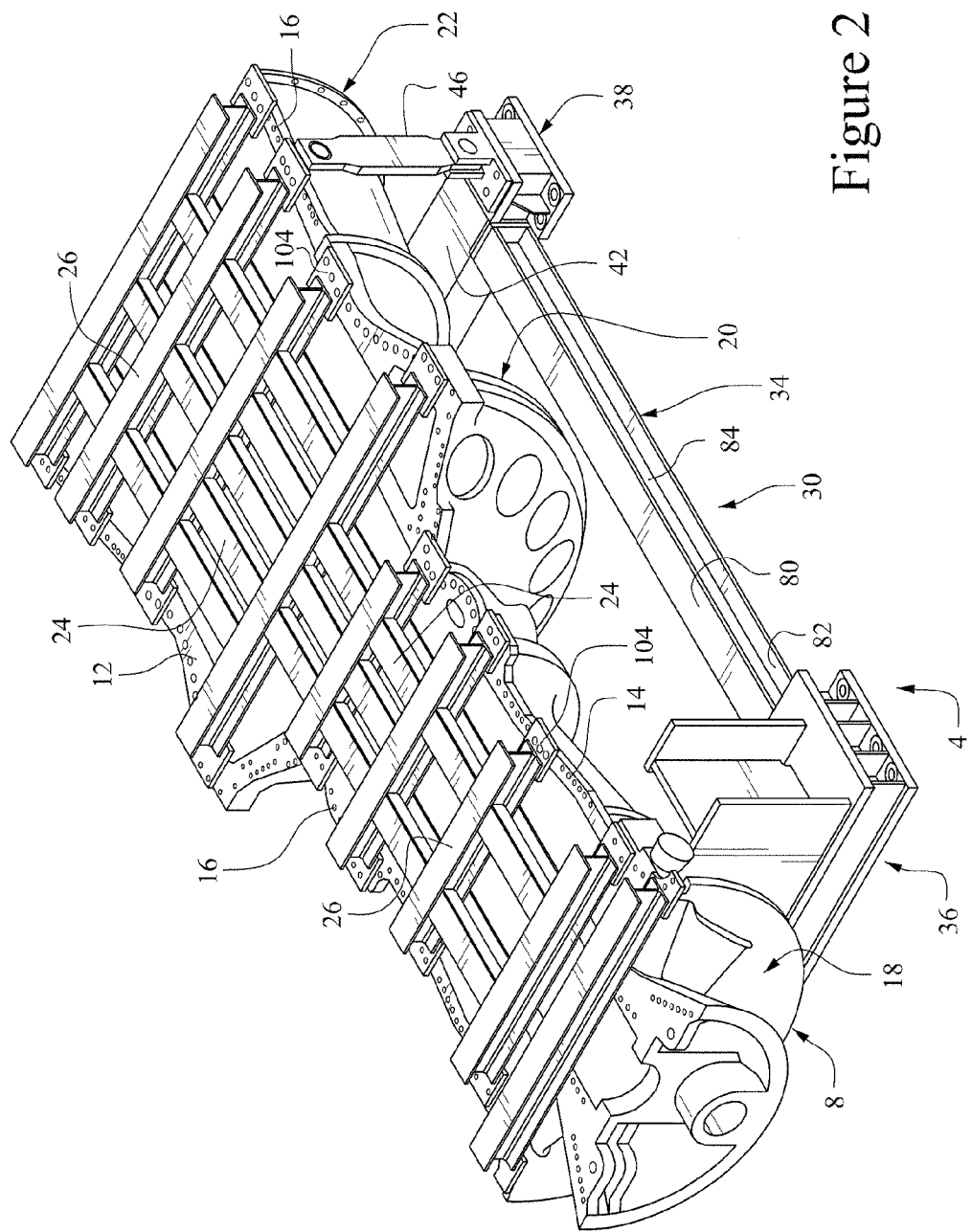
FIG. 2 is a perspective view of a lower half-casing with the support frame of FIG. 1, and including stiffening beams to facilitate lifting of the turbine lower half-casing.

FIG. 2 illustrates a lower-turbine half-casing 8 provided with horizontal joint flanges 12 and 14 extending along opposite sides of the casing that define the joint 10 shown in FIG. 1. As can be seen from the illustration, the joint flanges 12 and 14 each define an irregular, outer joining surface comprised of several sections, but for convenience, the collective sections will be referred to herein simply as joint flanges, one on each of the opposite sides of the lower half-casing.

At various positions along the joint flanges 12, 14, there are bolt holes 16 that enable the lower turbine half-casing 8 to be joined to the upper turbine half-casing (not shown, but similar to upper half-casing 6 in FIG. 1) after the turbine rotor (not shown) has been installed in the lower turbine half-casing.

As already noted, the invention provides lower turbine half-casing support structures that facilitate shipping of the lower turbine half-casing in a partially assembled state, i.e., with various components of the compressor 18, combustor 20 and turbine stages 22 (indicated by reference to the corresponding casing sections) assembled within the lower half-casing. In other words, the only major component not installed in the lower turbine half-casing 8 is the rotor assembly. In order to enable the shipping of the lower turbine half-casing 8 as described, the lower half-casing must be stiffened to prevent excess bending stresses, and supported from below such that all clearances are maintained with minimal if any realignment of components upon installation of the rotor assembly and upper turbine half-casing. Note that FIG. 2 shows plural axially-oriented stiffening beams 24 and plural transversely-oriented beams 26 secured by welding or bolting along and across the upper portion of the lower half-casing 8. These beams provide required stiffness, especially important during lifting of the lower half-casing from the support structure as required before, during or after shipment.

Figure 3:
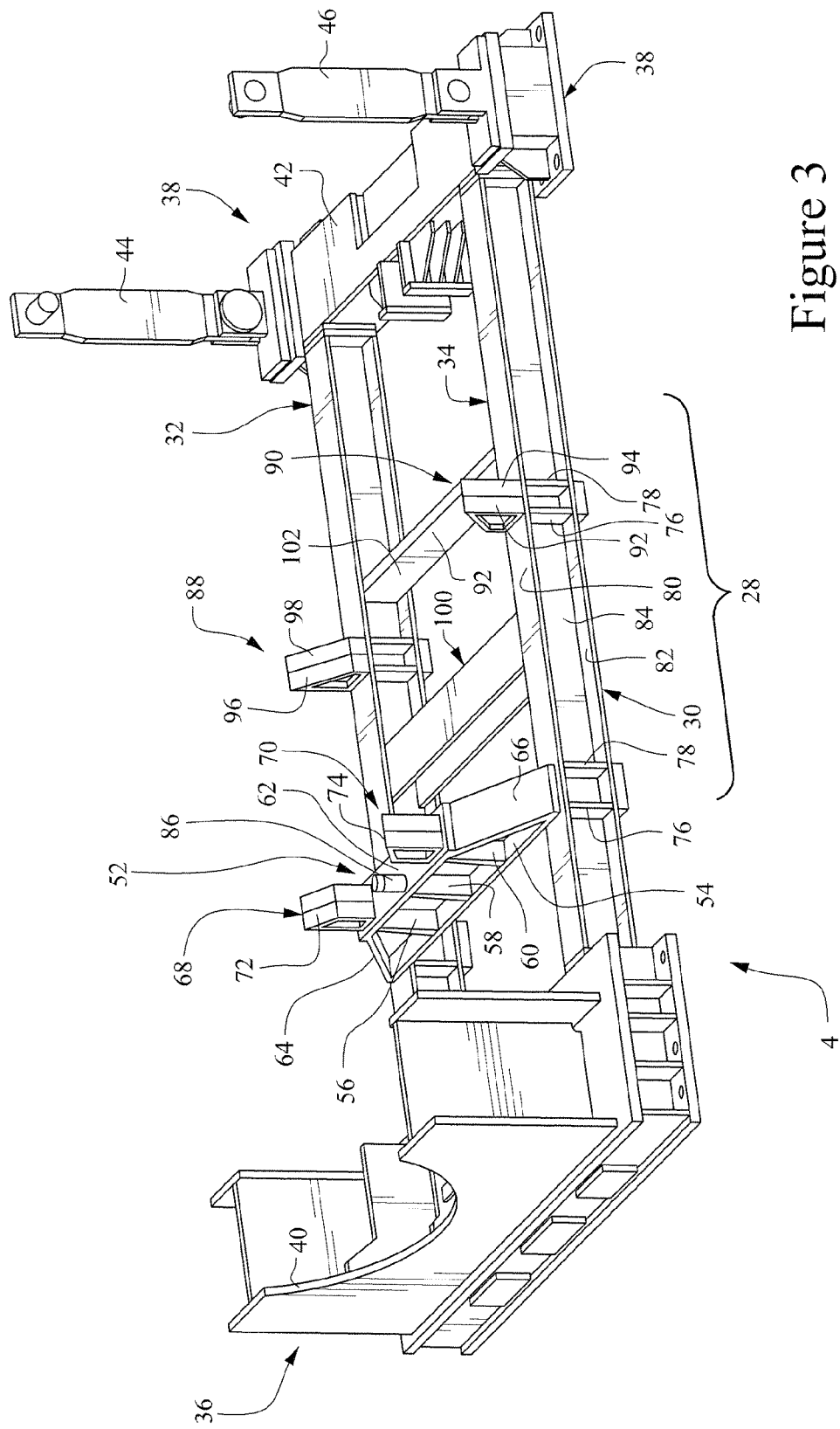
FIG. 3 is a perspective view of a modified support and shipping fixture in accordance with exemplary but nonlimiting embodiment of the invention.
Figure 4:
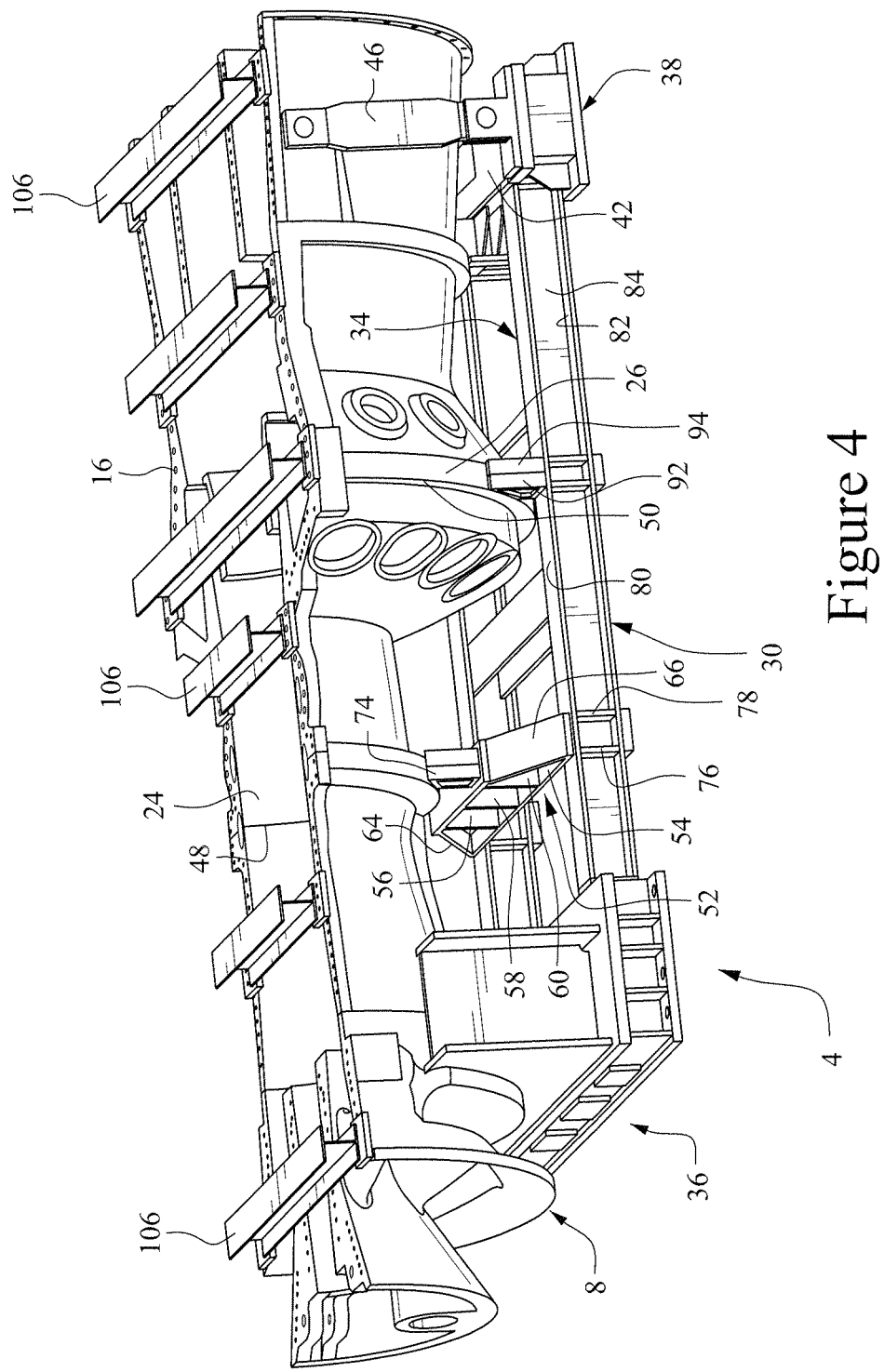
FIG. 4 is a perspective view of the support and shipping fixture shown in FIG. 2, but with the lower turbine casing supported thereon.
Figure 5:
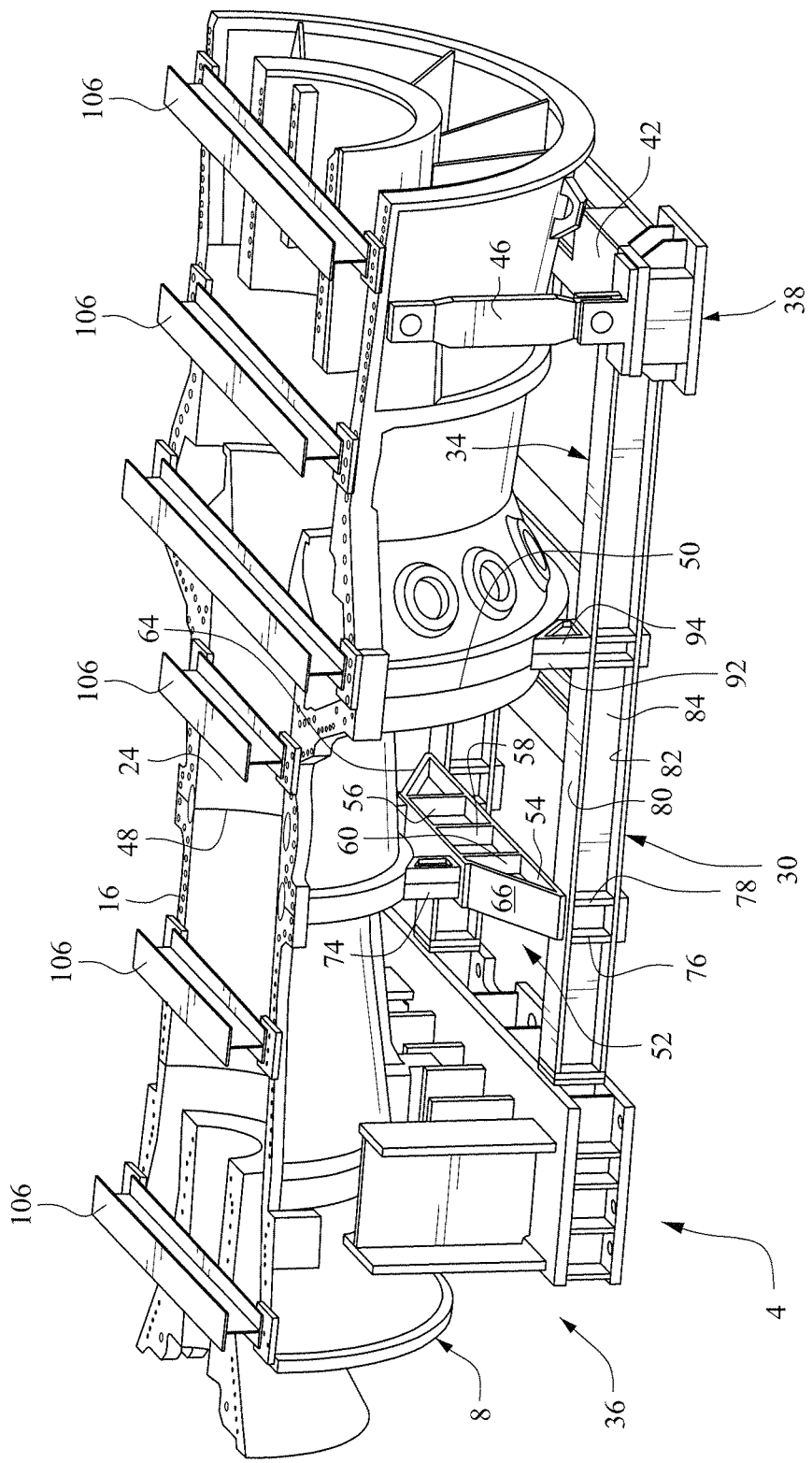
FIG. 5 is a perspective view similar to FIG. 3 but from a different viewpoint.

FIG. 2 also illustrates the conventional or standard base assembly 4 (FIG. 1) used for supporting the turbine during testing, and FIGS. 3-5 illustrate the standard base assembly in combination with a shipping support fixture assembly 28 (labeled as such only in FIG. 3) added to provide the necessary support during shipping in accordance with an exemplary embodiment of the invention.

The standard support assembly 4 includes a generally-rectangular frame 30 formed by a pair of substantially parallel, laterally-spaced I-beams 32, 34 connected at forward and aft ends by cross-beam assemblies 36, 38, respectively. The forward cross-beam assembly 36 includes a vertically-oriented curved plate or cradle 40 that supports the compressor section 18, and the aft cross-beam assembly 38 includes a flat plate 42 and vertically-oriented struts or plates 44, 46 that support the turbine stage section 22.

Before describing the shipping support fixture assembly 28 in detail, note the vertical joints at 48 and 50 (FIGS. 4 and 5) where the compressor section 18 of the lower half-casing joins the combustor section 20 (joint 48), and where the combustor section 20 joins the turbine stage section 22 (joint 50).

As best seen in FIG. 3, but with continued reference to FIGS. 4 and 5, the shipping support fixture assembly 28 includes a first lateral support structure 52 located at the compressor/combustor joint 48. The lateral support structure 52 has a generally truncated-triangle shape formed by a base plate 54 secured to the side beams 32, 34 by, for example, bolts or other means such as welding. In the exemplary embodiment, three vertical plates 56, 58 and 60 extend upwardly from the base plate 54 and are joined (i.e., welded) to an upper plate 62 which is substantially parallel to the base plate 54. The upper plate 62 has a shorter length dimension than the base plate 54, and first and second angled plates 64, 66 connect the opposite ends of the base plate 54 to the opposite ends of the upper plate 62. The angled plates may be oriented at an angle of about 30-60 degrees to horizontal. The upper plate 62 mounts a pair of blocks 68, 70 that engage the lower turbine half-casing at the compressor/combustor joint 48. The engaging surfaces 72, 74 of the blocks 68, 70, respectively, may be flat or may be curved to match the curvature of the half-casing. It will be understood that the size, shape and number of components used in the lateral support structure 52 may vary depending on turbine frame size, casing structure and the like.

Where the first lateral support structure 52 is joined to the side beams 32, 34, vertically-oriented stiffening members 76, 78 are inserted between the upper and lower flanges 80, 82, respectively, of the I-beams 32. 34, on both sides of the center, vertically-oriented web 84.

A standard jack device 86 is disposed along the upper plate 62 to assist in the accurate alignment of the fixture and turbine half-casing, and it will be understood that the jack need only have minimal lifting capacity, and may be of conventional design.

The shipping support assembly 28 also includes a second lateral support structure comprised of a pair of identical bearing blocks 88, 90 secured to the side-beams 32, 34, respectively, at the joint 50 between the combustor casing section 20 and the turbine stage casing section 22 of the lower half-casing. Each of the bearing blocks 88, 90 is comprised of a pair of back-to-back plates 92, 94 having a generally right-triangle configuration with angled support surfaces 96, 98, respectively, which also may be flat or curved. Here again, stiffening members 76, 78 are inserted between the upper and lower flanges of the respective side-beams (again on either side of the web 84), directly underlying the bearing blocks 88, 90.

In addition to the first and second lateral support structures described above, additional frame stiffening or rigidifying members are provided. Specifically, a first beam, preferably an I-beam 100, is welded or bolted to the side beams 32, 34, within the spaces between the upper and lower flanges 80, 82. This first stiffening member or beam is located axially between the first support structure 52 and the bearing blocks 88, 90.

A second stiffening plate or beam 102 is located axially between the bearing blocks 88, 90 and the aft cross beam assembly 38, closer to the bearing blocks. The second stiffening plate or beam 102 may be a vertically or horizontally-oriented double or single plate as shown, or it may be another I-beam similar to the first stiffening I-beam 100 and welded or bolted to the side beams 32, 34.

The lateral shipping support fixture assembly 28, in conjunction with the standard support base 4, provides the required support for shipping the lower half-casing.

It is contemplated that the lateral support structures as described may be used along with lifting fixtures that may be secured between the flanges 12 and 14 on the lower half-casing as already described. In this regard, the beams 26 may be bolted directly to the flanges 12, 14 using the existing bolt holes 16, or indirectly through pads 104 (FIG. 2) welded to the undersides of the beams 26. The number of beams, with or without pads, is dependent on the size of the gas turbine being shipped. FEA analysis is required to determine the number, location and size of the axial beams 24 and cross beams 26.

FIGS. 4 and 5 illustrate another stiffening beam configuration for attachment across the top of the lower half-casing, where only transverse beams 106 are employed.

In the arrangements shown in FIGS. 2, 4 and 5, the beams 26 and 106 span the width of the lower half-casing and provide additional support that simulates the stiffness of the upper-half casing such that for all intents and purposes, the lower half-casing has essentially the same stiffness characteristics during shipping as it has when fully assembled to the upper half-casing.

Thus, the invention described herein enables shipping of separate assemblies of the upper and lower gas turbine half-casings without the rotor, but with gas path and other hardware installed within the lower half-casing without excessive stresses and/or deflections.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiments disclosed as the best modes contemplated for carrying out this invention, but that the invention will include all embodiments falling within the scope of the appended claims.

What is claimed is:

1. A turbine lower half-casing and shipping fixture assembly comprising:
   a turbine lower half casing including a compressor section, a combustor section and a stage section in axial alignment and joined together at first and second joints, the lower half-casing having upper flanges adapted for mating engagement with corresponding flanges on an upper turbine half-casing;
   a shipping fixture assembly supporting said turbine lower half-casing, said shipping fixture assembly comprising a frame having a substantially rectangular shape including a pair of elongated, laterally-spaced side beams and a pair of transverse end beams;
   a first lateral support structure extending between said side beams at a first location corresponding to a first vertically-oriented joint between the turbine compressor section and the turbine combustor section; and
   a second lateral support structure comprising bearing blocks mounted on said side beams and engaging said lower turbine half-casing at a second location corresponding to a second vertically-oriented joint between the turbine combustor section and the turbine stage section.

2. The turbine lower half-casing and shipping fixture assembly of claim 1 wherein said first lateral support structure comprises a base plate extending laterally between said side beams; plural vertical plates extending upwardly from the base plate and joined to an upper plate that is substantially parallel to the base plate; wherein said upper plate has a shorter length dimension than said base plate, and wherein first and second angled plates connect opposite ends of said base plate to opposite ends of said upper plate.

3. The turbine lower half-casing and shipping fixture assembly of claim 1 including a jack disposed along said upper plate.

4. The turbine lower half-casing and shipping fixture assembly of claim 1 wherein said bearing blocks are provided with angled or curved surfaces that engage said turbine lower half-casing at said second location.

5. The turbine lower half-casing and shipping fixture assembly of claim 2 wherein said base plate comprises an I-beam.

6. The turbine lower half-casing and shipping fixture assembly of claim 1 wherein said side beams comprise I-beams and wherein, at said first and second locations stiffening blocks are provided between upper and lower flanges of said I-beams.

7. The turbine lower half-casing and shipping fixture assembly of claim 1 wherein at least one stiffening bar extends between said side beams at a third location between said first and second locations.

8. The turbine lower half-casing and shipping fixture assembly of claim 7 wherein a second stiffening bar extends between said side beams at a fourth location between said second location and one of said transverse end beams at said stage section.

9. The turbine lower half-casing and shipping fixture assembly of claim 1 further comprising a plurality of beams extending laterally between said upper flanges on opposite sides of said lower half-casing.

10. A turbine lower half-casing and shipping fixture assembly comprising:
    a turbine lower half casing including a compressor section, a combustor section and a stage section in axial alignment and joined together at first and second joints, the lower half-casing having upper flanges adapted for mating engagement with corresponding flanges on an upper turbine half-casing;
    a shipping fixture assembly supporting said turbine lower half-casing, said shipping fixture assembly comprising a frame having a substantially rectangular shape including a pair of elongated, laterally-spaced side beams and a pair of transverse end beams;
    a first lateral support structure extending between said side beams at a first location corresponding to a first vertically-oriented joint between the turbine compressor section and the turbine combustor section;
    a second lateral support structure comprising bearing blocks mounted on said side beams and engaging said lower turbine half-casing at a second location corresponding to a second vertically-oriented joint between the turbine combustor section and the turbine stage section;
    at least two additional stiffening bars extending between said side beams at locations axially between said first and second lateral support structures, and axially between said second lateral support structure and one of said transverse end beams; and a plurality of beams extending laterally between said upper flanges on opposite sides of said lower half-casing.

* * * * *

UNITED STATES PATENT AND TRADEMARK OFFICE
CERTIFICATE OF CORRECTION

PATENT NO. : 8,876,448 B1
APPLICATION NO. : 14/012503
DATED : November 4, 2014
INVENTOR(S) : John Hess et al.

Page 1 of 1

It is certified that error appears in the above-identified patent and that said Letters Patent is hereby corrected as shown below:

In the Claims

At Column 5, line 55, delete "1" and insert -- 2 -- between "assembly of claim" and "including a jack disposed along said"

Signed and Sealed this
Twenty-fourth Day of February, 2015

Michelle K. Lee
*Deputy Director of the United States Patent and Trademark Office*